Apr. 17, 1923.
F. J. MARTIN
TOOL HOLDER
Filed Nov. 3, 1921
1,451,705
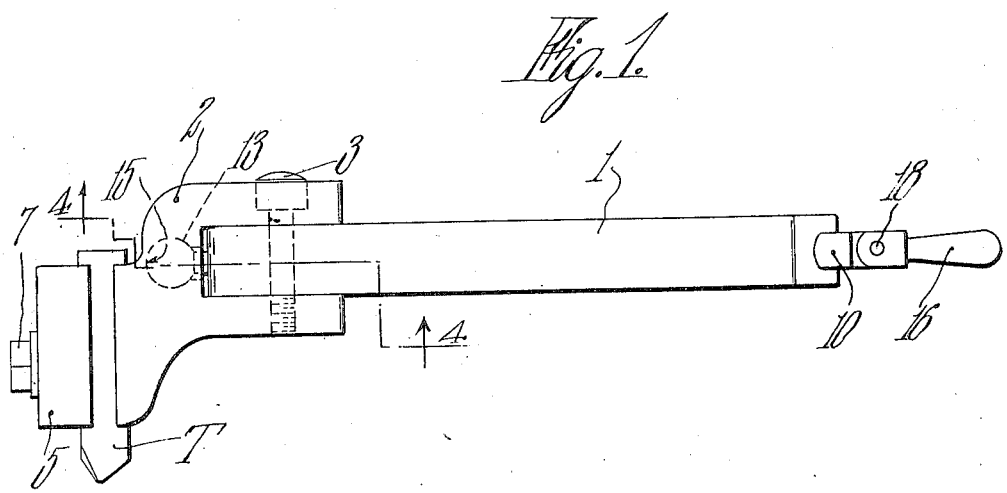
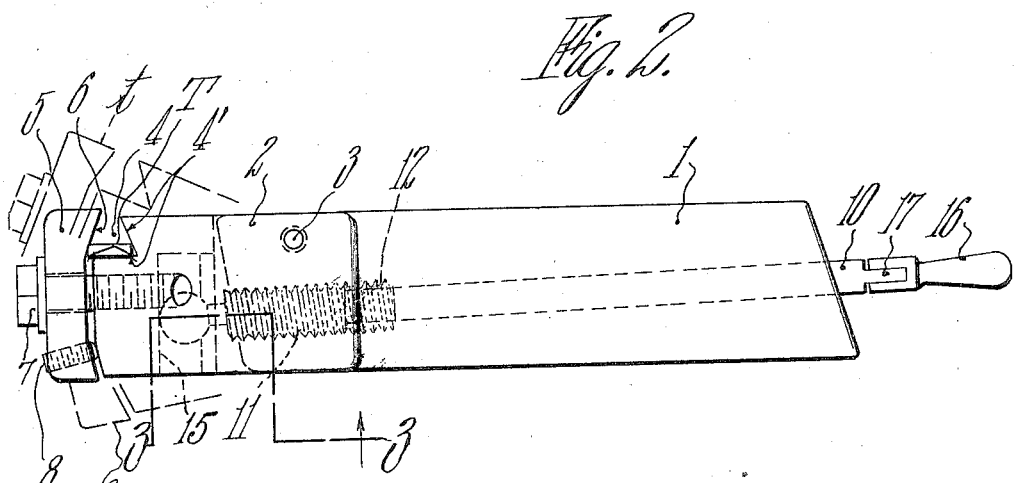
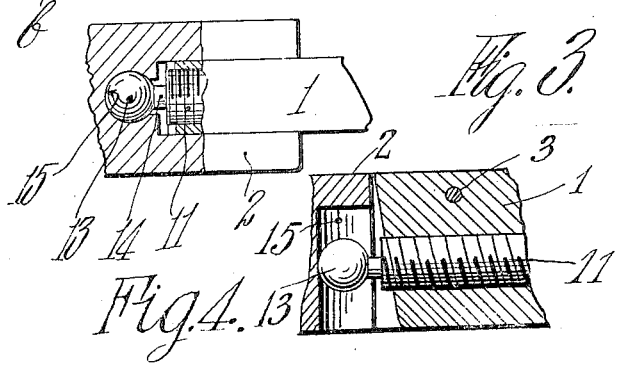

Patented Apr. 17, 1923.

1,451,705

UNITED STATES PATENT OFFICE.

FRANK JAMES MARTIN, OF TURNERS FALLS, MASSACHUSETTS, ASSIGNOR TO MARTIN MACHINE COMPANY, INC., A CORPORATION OF MASSACHUSETTS.

TOOL HOLDER.

Application filed November 3, 1921. Serial No. 512,505.

*To all whom it may concern:*

Be it known that I, FRANK JAMES MARTIN, a citizen of the United States, residing at Turners Falls, in the county of Franklin and State of Massachusetts, have invented new and useful Improvements in Tool Holders, of which the following is a specification.

This invention relates to improvements in tool holders and is directed particularly to the type of holders wherein the tool may be moved or adjusted relative to the shank or body of the holder.

The principal object of the invention is the provision of means, by which the tool-carrying member of the holder is positively moved back and forth to various adjusted positions and held therein, such adjustment being made without moving the tool holder shank from its position in the tool post or clamping straps of a lathe, planer or the like.

Other objects and advantages will appear from the following description and accompanying drawings in which the invention is disclosed in an embodiment at present preferred.

In the drawings,—

Fig. 1 is a top plan view of a tool holder embodying my invention;

Fig. 2 is a side elevational view of the same; and

Fig. 3 is a section on the line 3—3 of Fig. 2.

Fig. 4 is a section on the line 4—4 of Fig. 1.

Referring to the drawings; 1 represents a shank or body of the tool holder and is preferably in the form of a bar of rectangular cross-section, such as is commonly used in devices of this character. This shank 1 is adapted to be supported in a machine in any suitable manner, as by clamping it in the tool post of a lathe or by the clamping straps of a planer or the like. A member 2 for holding a cutting tool T is pivoted to the shank 1 by any suitable means such as a stud 3, which permits the member to swing to various adjusted positions, such as those indicated by dotted lines *t* and *b* in Fig. 2. A tool-receiving recess 4 is formed in the member 2 by the converging faces 4' as best shown in Fig. 2. A clamping strap 5, having an angular tool engaging face 6, fits loosely over a clamping screw 7—that is in threaded engagement with the member 2— and is adapted to force the tool T into the recess 4 of the member 2 while a set screw 8 carried by the clamp 5 functions as an abutment for engaging the lower portion of the member 2 for the clamping of the tool T by the clamp strap 5. The recess 4, as here shown, positions the tool T transversely to the shank 1, whereby the cutting edge of the tool T may be located at various distances from the shank. This renders the device particularly applicable as a side cutting tool or for cutting internal threads or the like. While I have shown the tool T positioned transversely to the shank, it is obvious that it may be disposed parallel to the shank or at various angular positions relatively thereto.

The member 2 is further provided with a cylindrical bore or elongated socket 15 as shown.

Regardless of the positioning of the tool T, the important function of raising or lowering its cutting edge is accomplished by the swinging movement of the member 2 with respect to the shank 1. Such raising or lowering is particularly desirable in centering work, as for instance when work is being rotated by the face plate of a lathe and the shank of the tool holder is securely clamped in the tool post, the cutting tool may be adjusted by raising or lowering to align its cutting edge with the center line of the work.

For swinging the member 2 about its pivot 3 a shaft 10 is provided that extends longitudinally through the shank 1 and has at one end thereof a threaded portion 11 interfitting an internal thread 12 of the shank 1. A ball 13 fixed to a reduced portion 14 of the shaft 10 is adapted to rotate freely in the cylindrical bore or elongated socket 15 of the member 2. A lever handle 16 is slotted to receive a flattened portion 17 of the shaft 10 and is pivoted thereto as at 18.

In operation, the shank 1 of the holder may be clamped in a tool post of a lathe or the like in the usual manner and the cutting edge of the tool positioned in its approximate height as by blocking the shank or moving the rocker of the tool post. The exact height or location of the cutting edge desired is attained by the swinging of the clamping member 2 and this is accomplished by the turning of the shaft 10 which, by reason of its ball and socket connection with the member 2, moves or swings the said member upon its pivot upwardly or downwardly depending upon the direction of rotation of the said shaft.

It will be observed that it is therefore possible to clamp the tool holder securely in place and that the cutting edge may be positively moved to various positions and thereafter held in its adjusted positions.

It is obvious that many changes may be made in the form of the invention herein disclosed to adapt it to various uses without departing from the scope of the invention which is defined by the appended claims rather than by the foregoing description.

What I claim is—

1. A tool-holder, comprising in combination, a shank, a tool-carrying member pivoted thereto for swinging movement in a direction at right angles to that in which the tool is disposed, and means carried by the shank for swinging said member into various positions of adjustment.

2. A tool-holder, comprising in combination, a shank, a tool-carrying member pivoted thereto for swinging movement in a direction substantially at right angles to that in which the cutting tool is located, and means carried by the shank for swinging the clamping member and holding it in various positions of adjustment.

3. A tool-holder, comprising in combination, a shank, a tool-carrying member pivoted thereto for swinging movement in a direction substantially at right angles to the tool, and means carried by the shank to positively swing said member back and forth into various positions of adjustment.

4. A tool-holder, comprising in combination, a shank, a tool-carrying member pivoted thereto, means carried by the shank for swinging said member comprising a rotatable shaft in threaded engagement with the shank adapted to abut and swing the clamping member about its pivot.

5. In a tool-holder, in combination, a shank, a tool-carrying member pivoted thereto to swing to various adjusted positions, and a shaft in threaded engagement with the shank having a ball and socket connection with said member for swinging it to and holding it in its various adjusted positions.

6. In a tool-holder, in combination, a shank, a tool-carrying member pivoted thereto to swing to various adjusted positions and means for swinging said member to and holding it in its various adjusted positions, comprising a shaft mounted in the shank and in threaded engagement therewith having a ball at one end thereof and an elongated socket provided in the tool-clamping member to receive said ball.

7. A tool-holder, comprising, a shank, a tool-carrying member pivoted thereto, a member longitudinally movable in said shank for swinging the first-named member about said pivot into various positions of adjustment, and means positively connecting said members and compensating for the differences in direction of movement thereof.

In testimony whereof I have affixed my signature.

FRANK JAMES MARTIN.